United States Patent [19]

Van Raaij

[11] Patent Number: 4,554,701
[45] Date of Patent: Nov. 26, 1985

[54] VACUUM STREET SWEEPER AND FILTER APPARATUS THEREFOR

[76] Inventor: Karel W. M. Van Raaij, 1800 AG Alkmaar, Netherlands

[21] Appl. No.: 579,167

[22] Filed: Feb. 10, 1984

[51] Int. Cl.[4] .......................... E01H 1/08; B01D 50/00
[52] U.S. Cl. .......................................... 15/340; 15/347; 15/352; 55/319; 55/323; 55/332; 55/472; 55/478; 55/482; 55/DIG. 3
[58] Field of Search ................. 55/319, 323, 332, 478, 55/482, 485, 472, DIG. 3; 15/340, 347, 352

[56] References Cited

U.S. PATENT DOCUMENTS

| | | | |
|---|---|---|---|
| 2,143,144 | 1/1939 | Fagerberg | 55/472 |
| 2,226,630 | 12/1940 | McCord | 55/323 |
| 2,458,258 | 1/1949 | Furr | 15/340 |
| 2,573,556 | 10/1951 | Fain | 55/478 |
| 2,784,440 | 3/1957 | Newport | 15/340 |
| 3,173,777 | 3/1965 | Tamny | 15/347 |
| 3,238,556 | 3/1966 | Martin | 15/330 |
| 3,242,521 | 3/1966 | Young | 15/352 |
| 4,373,227 | 2/1983 | Kimzey et al. | 15/347 |

Primary Examiner—David L. Lacey
Attorney, Agent, or Firm—Rogers, Howell, Renner, Moore & Haferkamp

[57] ABSTRACT

A motorized vehicular vacuum street sweeper (2) includes a hopper (14), a vacuum system (12) for suctioning debris and depositing same in the hopper (14), and a multi-stage filtration system (16) including a coarse filter above the hopper (14) and two different material filters (54 and 56) in an exhaust section (30) of the vacuum system (12) downstream and external of the hopper (14) to filter dust and the like and afford a cleaner exhaust to the atmosphere.

21 Claims, 5 Drawing Figures

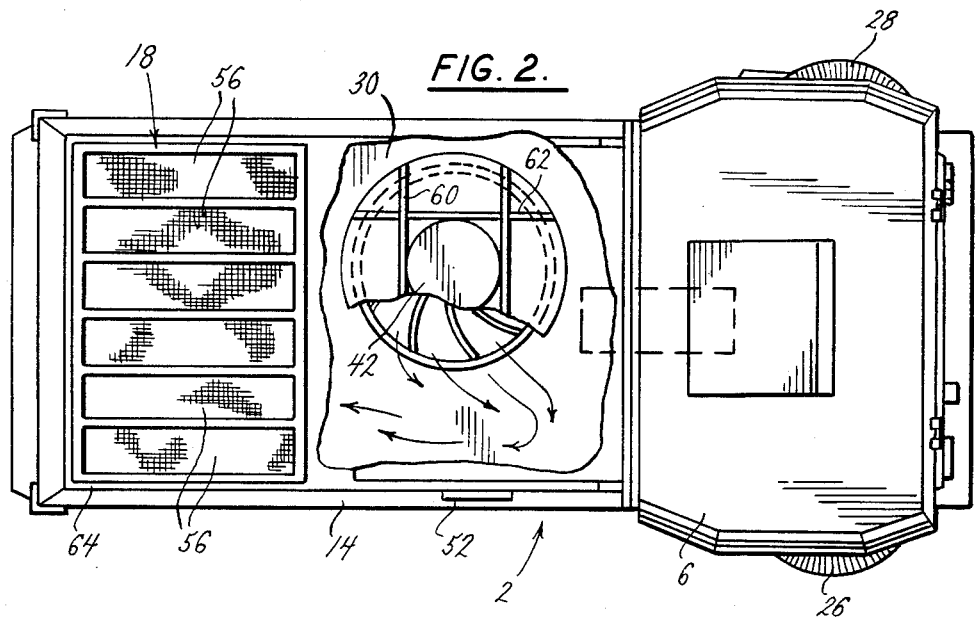
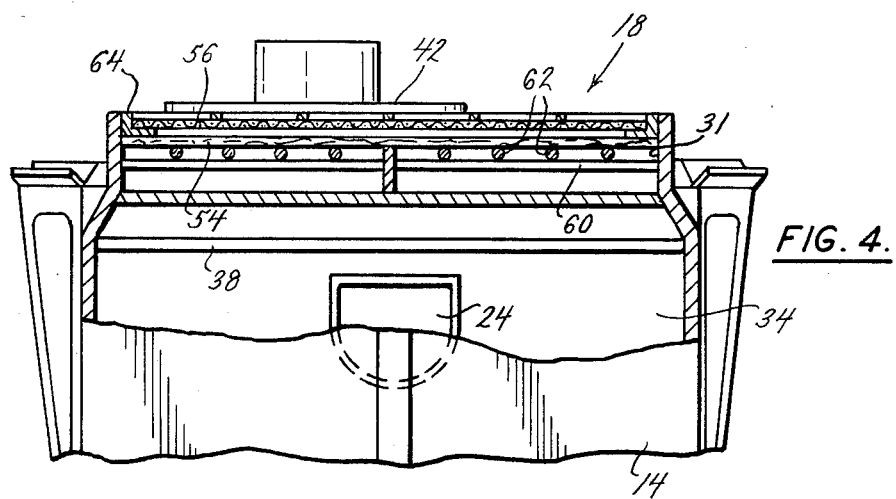
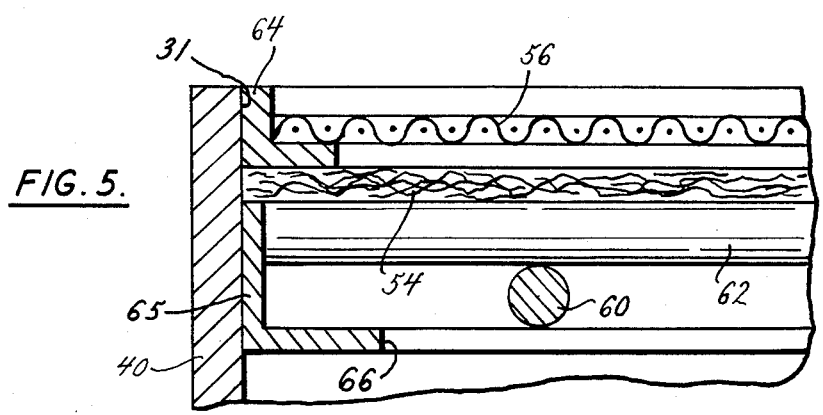

VACUUM STREET SWEEPER AND FILTER APPARATUS THEREFOR

BACKGROUND AND SUMMARY

The invention relates to vacuum street sweepers, including the motorized vehicular type having a hopper for receiving debris and a vacuum system for suctioning debris and depositing same in the hopper.

Vacuum street sweepers typically have a filtering screen inside the hopper, providing single stage filtration. This type of filtration involves a trade-off of air pollution versus vacuum suctioning power. If the screen inside the hopper is made very fine, air pollution and emission of particulate matter is reduced, but so is vacuum suctioning power. Furthermore, there is increased likelihood of the screen becoming obstructed by mud. If the screen inside the hopper is made very coarse, vacuum suctioning power is maintained, but air pollution is increased. Furthermore, the larger particulate matter emitted through the system decreases blower life.

One type of known dust filtering system utilizes the filter bag technique wherein a plurality of tubes of filtration material limit dust emission. This system is objectionable because of high cost and difficulty in cleaning the bags.

The present invention addresses and solves the need for a cost effective vacuum street sweeper filtration system affording both high vacuum suctioning power and low air pollution emission. The invention further facilitates prolonged blower life and reduced screen-clogging. The entire filtration system of the invention is particularly easy to clean and maintain.

BRIEF DESCRIPTION OF THE DRAWINGS

FIG. 2 is a top view of the structure of FIG. 1.

FIG. 4 is an enlarged cross sectional view taken along line 4—4 of FIG. 1.

FIG. 5 is an enlarged view of a portion of FIG. 4.

DETAILED DESCRIPTION

Figure 1:
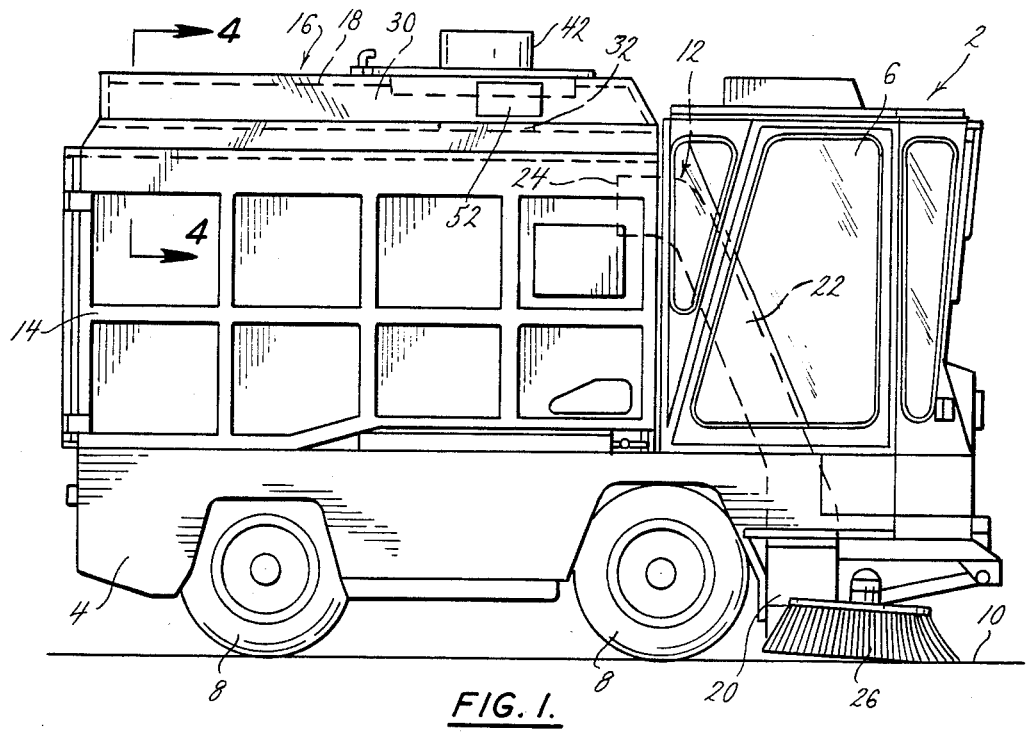
FIG. 1 is a side elevation view of a vacuum street sweeper incorporating a filtration system in accordance with the invention.
Figure 3:
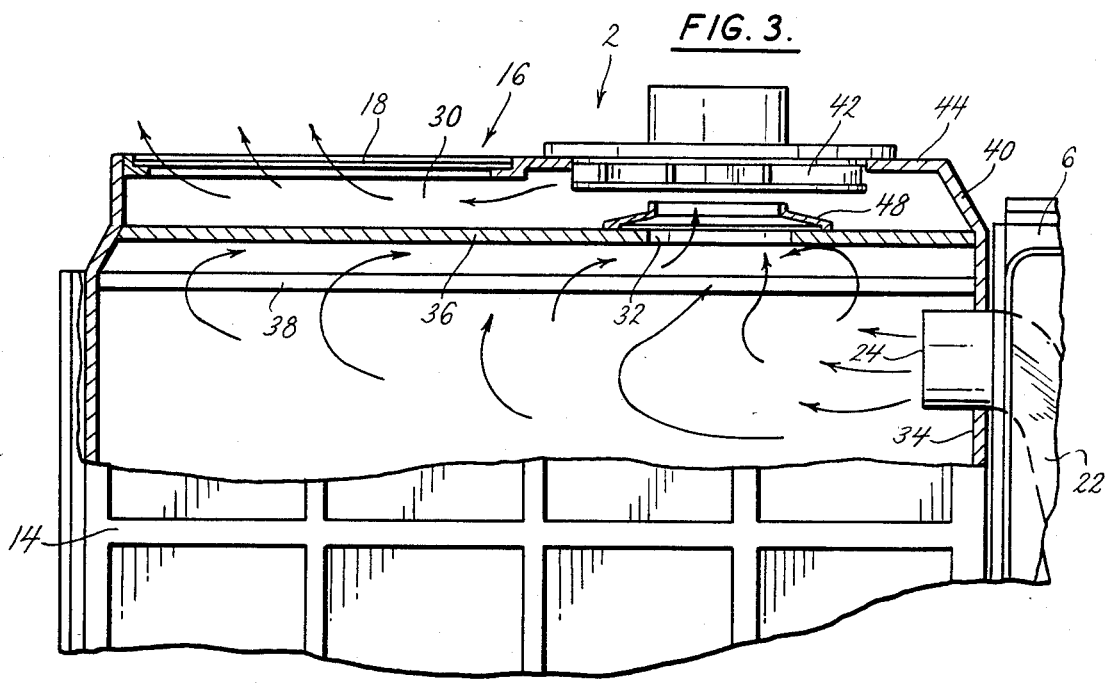
FIG. 3 is an enlarged view, partially cut away in section, of a portion of FIG. 1.

FIG. 1 shows a motorized vehicular vacuum street sweeper 2 including a chassis or frame 4 and operator cab 6 supported on wheels 8 on street surface 10. Vacuum system 12 suctions debris from street 10 and deposits same in receiving hopper 14. Filtration system 16 includes filter means 18, FIGS. 1-3, in the vacuum system downstream and external of the hopper to filter dust and the like and afford a cleaner exhaust to the atmosphere.

Vacuum system 12 includes an intake section 20 upstream of the hopper for suctioning debris from street 10 and transmitting the debris through a transfer passage 22 to an inlet port 24 in hopper 14. Intake section 20 opens downwardly proximate street 10 and is between oppositely rotating sweeper brushes 26 and 28 which direct and funnel debris toward vacuum intake 20. Vacuum system 12 includes an exhaust section 30 downstream of hopper 14 for suctioning air from an outlet port 32 in the hopper, FIG. 3. Filter means 18 extends across an exhaust or discharge opening 31 (FIGS. 4 and 5), in exhaust section 30 which is external of hopper 14.

Hopper inlet port 24 is in a sidewall 34 of the hopper, and hopper outlet port 32 is in a top wall 36 of the hopper. An initial coarse filter screen 38 extends laterally across the hopper between the sidewalls thereof proximate top wall 36, below outlet port 32 and above inlet port 24. Coarse screen 38 may be a wide mesh, perforated plate, or the like. Coarse screen 38 separates the inlet and outlet ports 24 and 32 such that debris entering inlet port 24 is blocked from reaching outlet port 32 and settles in the bottom of hopper 14. Coarse screen 38 permits passage of dust and small particulate matter therethrough to minimize reduction of vacuum power.

Exhaust section 30 includes a dust collection compartment 40 above hopper 14. Blower 42 in top wall 44 of compartment 40 draws external air carrying dust and small particulate matter which as stated above, is permitted to pass through the coarse screen 38. This air, carrying dust and small particulate matter, is drawn by the blower 42 through port 32. The blower 42 expels the air, dust, and small particulate matter leftwardly through the dust collection compartment 40 for exhaustion through filter means 18 that span the exhaust or discharge opening in top wall 44. The blower 42 creates the upward suction force through hopper outlet port 32, and in turn the leftward suction force through hopper inlet, port 24. Blower 42 is above hopper outlet port 32 and its exit flange 48. The exhaust or discharge opening 31 and the filter means 18 are laterally spaced from the blower. Dust collection compartment 40 thus has an inlet from hopper outlet port 32, and has an outlet to the atmosphere through filter means 18.

Dust collection compartment 40 has access means such as openable door 52 and removable filter means 18 for removing collected dust and cleaning the compartment. Filters means 18 are cleanable by a reverse flow flush therethrough downwardly opposite the direction of exhaust. For example, opening of door 52 permits a rapid water flush-out of dust collected in compartment 40.

Filtration system 16 includes two different material filters 54 and 56 in series, FIGS. 4 and 5. These filters are removably mounted in compartment 40 in flat parallel back-to-back relation. Filter 54 is a cloth layer, such as polyester. Filter 56 is a fine wire mesh screen. The filters are supported on a cross bar lattice matrix including left-right longitudinal bars such as 60 and front-back bars such as 62. The filters are removably secured from above by a grate insert plate 64. As shown in FIG. 4, the matrix of bars 60 and 62 may be supported in any conventional way, such as on the outer edges of a peripheral angle member 65 defining an air passage opening 66 therebetween and secured to the dust collection compartment by any known manner. Screen 38 in the hopper may be made coarse so as to minimize reduction of vacuum power and reduce clogging thereof. Filter 54 and 56 can be made very fine, using very thin filter cloth.

It is recognized that various modifications are possible within the scope of the appended claims.

I claim:

1. A vacuum street sweeper comprising a body, wheels for supporting the body and allowing movement of the sweeper along a street, a hopper within the body for receiving debris, an inlet to the hopper, a hopper outlet from the hopper, an exhaust section within the body communicating with the outlet, an exhaust outlet from the exhaust section, a vacuum system blower means supported within the exhaust section for suctioning debris through the inlet and into said hopper, initial filter means in said hopper upstream of said hopper outlet for filtering relatively coarse debris particles while allowing air carrying relatively fine dust and the like to pass therethrough, secondary filter means in the exhaust section remote from the initial filter means and positioned and arranged to filter dust and the like prior to the air exiting the exhaust outlet, the blower means being in flow communication with the hopper outlet and being positioned and arranged with respect to the exhaust outlet so as to discharge air through the secondary filter means whereby the blower means causes air flow through the initial filter means, through the hopper outlet, the secondary filter means, and the exhaust outlet.

2. The street sweeper according to claim 1: including an intake section communicating with the inlet for suctioning debris from the street and transmitting said debris to the inlet, the hopper having walls defining an internal chamber having a transverse area substantially greater than the area of the hopper outlet, said initial filter means extending substantially across the transverse area of said hopper.

3. The street sweeper according to claim 1 wherein said exhaust section comprises a dust collection compartment for accumulating dust that has passed through the initial filter means, said dust collection compartment having access means for removing collected dust and cleaning said compartment.

4. The street sweeper according to claim 3 wherein said secondary filter means is cleanable by a reverse flow flush therethrough opposite the direction of exhaust, and wherein said access means comprises openable door means permitting rapid flushing out of dust collected in said compartment.

5. The street sweeper according to claim 1 wherein:
the initial filter means in said hopper includes a coarse screen and the initial filter means is between said inlet and said outlet such that heavy debris entering said inlet is blocked from reaching said outlet and settles in said hopper, said coarse screen permitting the passage of dust and the like therethrough to minimize reduction of vacuum power;
and wherein said secondary filter means comprises two different material filters in series.

6. The street sweeper according to claim 5 wherein said secondary filters are removably mounted in said dust collection compartment in flat parallel back-to-back relation.

7. The street sweeper according to claim 5 wherein said secondary filters comprise a cloth layer and a wire mesh screen layer supported on a cross bar lattice matrix in said compartment.

8. The vacuum street sweeper according to claim 1 wherein the hopper has walls including a top wall, side walls, and a bottom wall:
said hopper inlet is in a sidewall of said hopper;
said hopper outlet is in the top wall of said hopper;
said dust collection compartment is above said hopper; and
said secondary filter means is in a top wall of said compartment laterally spaced from said blower means.

9. A vacuum street sweeper comprising: a hopper, an inlet port communicating with the hopper, an outlet port communicating with the hopper; a vacuum system having a blower means communicating with the outlet port for establishing a vacuum through the outlet port, the hopper, and the inlet port for thereby suctioning debris and depositing same in said hopper; a discharge outlet from the vacuum system, and a filtration system comprising first filter means in the hopper, and second filter means in said vacuum system, the blower means in the vacuum system being in flow communication with the hopper outlet port and being positioned and arranged with respect to the discharge outlet so as to discharge air through the second filter means whereby the blower means causes air flow through the first filter means, through the hopper outlet port, the second filter means, and the discharge outlet, the first filter means comprising a coarse screen to prevent heavy debris from reaching the blower means and the second filter means comprising fine mesh material to filter dust and the like to afford a cleaner exhaust to the atmosphere.

10. The vacuum street sweeper according to claim 9 wherein the vacuum system includes an exhaust section between the outlet port and the discharge outlet, an intake section communicating with the inlet port, the inlet port being positioned in an upper portion of said hopper; and the outlet port being positioned in an upper portion of said hopper; the first filter means being located in said hopper separating said inlet and outlet ports such that debris entering said inlet port is blocked by said first filter means from reaching said outlet port and settles in said hopper, said first filter means permitting the passage of dust and the like therethrough to minimize reduction of vacuum power; and wherein said second filter means are in said exhaust section.

11. The street sweeper according to claim 9 wherein said second filter means are removably mounted in said vacuum system in flat parallel back-to-back relation.

12. The street sweeper according to claim 9 wherein said second filter means comprise a cloth layer and a wire mesh screen.

13. The street sweeper according to claim 12 including a cross bar lattice matrix supporting said second filter means.

14. A vacuum street sweeper comprising:
an intake section for suctioning debris from a street,
means defining a transfer passage in communication with the intake section,
a hopper for receiving debris including means defining an inlet port opening to the hopper and means defining an outlet port opening from the hopper remote from the inlet port, the inlet port being in communication with the transfer passage to deliver debris to the hopper,
an initial coarse filter means in the hopper extending substantially thereacross in the path of air flow between the inlet port and the outlet port to block heavy debris coming into the inlet port from reaching the outlet port, the initial coarse filter means permitting the passage of dust therethrough,
a dust collection compartment in communication with the outlet port for accumulation of dust therein,
a blower means in the dust collection compartment operable to draw air through the outlet port into the dust collection compartment and for creating a suction in series through the hopper, the inlet port, and the transfer passage to the intake section,
means defining an exhaust opening in the dust collection compartment and in the path of air blown from the blower, exhaust filter means extending substantially across the exhaust opening to prevent the escape of dust therefrom, whereby heavy debris and dust on a street may be suctioned therefrom into the intake section along with a quantity of air, the heavy debris being deposited in the hopper, the dust being passed through the coarse filter means and into the dust compartment, and the air being exhausted through the exhaust filter substantially free of the dust.

15. The street sweeper of claim 14 including openable door means in the dust collection compartment to permit access thereto for flush cleaning.

16. The vacuum street sweeper of claim 14 wherein the coarse filter means is positioned in substantially horizontal orientation adjacent the upper portion of the hopper, the area of the coarse filter means is greater than the area of the outlet and of the inlet whereby air moved relatively slowly through the coarse filter means allows heavy debris to fall therefrom.

17. A vacuum street sweeper comprising a chassis including a body; the body including a plurality of walls defining an enclosed hopper; an inlet port opening through one of the walls to the hopper; means defining a transfer passage having a first open end communicating with the inlet port and having a second open end; means defining a vacuum intake communicating with the second open end; the transfer passage being supported on the chassis with the vacuum intake directed downwardly to suction debris from a street upon creating a vacuum at the vacuum intake; an outlet port opening from the hopper; a dust collection compartment within the body communicating with the outlet port; a discharge opening from the dust collection compartment; blower means mounted within the dust collection compartment having a discharge side upstream of and communicating with the discharge opening by way of the dust collection compartment and having a suction side communicating with the outlet port to create a vacuum through the outlet port, the hopper, the inlet port, and the transfer passage to the vacuum intake; primary filter means within the hopper between the inlet port and the outlet port; the primary filter means having coarse grid openings blocking the passage of heavy debris while permitting the passage of air carrying dust and fine particles therethrough; secondary filter means between the discharge opening and the blower means; the secondary filter means having fine mesh to block the passage of dust and fine particles while permitting the flow of air therethrough.

18. The vacuum street sweeper of claim 17 wherein the hopper has side walls, a top wall, and a bottom wall, the inlet port being through a side wall near to but spaced from the top thereof, the first filter means extending generally horizontally across the hopper above the inlet port, whereby heavy debris can fall into the hopper.

19. The vacuum street sweeper of claim 18 wherein the outlet port extends through the top wall, the first filter means being spaced below the top wall of the hopper, the area of the first filter means being substantially greater than the area of the inlet port and the area of the outlet port whereby air flows faster through the inlet and outlet ports than past the first filter means.

20. The vacuum street sweeper of claim 19 wherein the dust collection compartment is positioned above the hopper, the dust collection compartment having a top wall and side walls and a bottom wall common with the top wall of the hopper, the discharge opening being through the top wall of the dust collection compartment.

21. The vacuum street sweeper of claim 17 including a pair of rotatable brushes rotatably supported by the body on opposite sides of the vacuum intake.

* * * * *